(12) United States Patent
Burggraf

(10) Patent No.: US 11,465,542 B2
(45) Date of Patent: Oct. 11, 2022

(54) TABLE FOR A VEHICLE

(71) Applicant: Seisenbacher Gmbh, Ybbsitz (AT)

(72) Inventor: Lorenz Burggraf, Bonn (DE)

(73) Assignee: Seisenbacher Gmbh, Ybbsitz (AT)

( * ) Notice: Subject to any disclaimer, the term of this patent is extended or adjusted under 35 U.S.C. 154(b) by 0 days.

(21) Appl. No.: 17/268,076

(22) PCT Filed: Aug. 6, 2019

(86) PCT No.: PCT/AT2019/060250
§ 371 (c)(1),
(2) Date: Feb. 11, 2021

(87) PCT Pub. No.: WO2020/033982
PCT Pub. Date: Feb. 20, 2020

(65) Prior Publication Data
US 2021/0300226 A1   Sep. 30, 2021

(30) Foreign Application Priority Data
Aug. 13, 2018  (AT) .............................. A 50688/2018

(51) Int. Cl.
*B60N 3/00*  (2006.01)
*B60N 2/42*  (2006.01)
*B60N 2/427*  (2006.01)
*B61D 37/00*  (2006.01)

(52) U.S. Cl.
CPC ........... *B60N 3/001* (2013.01); *B60N 2/4214* (2013.01); *B60N 2/42709* (2013.01); *B61D 37/00* (2013.01)

(58) Field of Classification Search
CPC ...... A47B 31/06; B60N 3/001; B60N 2/4214; B60N 2/42709
USPC ........................................................... 108/44
See application file for complete search history.

(56) References Cited

U.S. PATENT DOCUMENTS

| | | | | |
|---|---|---|---|---|
| 7,963,231 B2 * | 6/2011 | Osborne | ................ | A47B 5/006 108/42 |
| 8,171,862 B2 * | 5/2012 | Muirhead | ............. | B64D 11/00 108/50.01 |
| 8,596,206 B2 * | 12/2013 | Legeay | ............. | B64D 11/0638 297/145 |
| 8,757,068 B2 * | 6/2014 | Schmidt | ................. | B64D 11/00 297/216.16 |
| 2009/0249982 A1 * | 10/2009 | Palethorpe | ............... | A47B 5/00 108/44 |
| 2012/0132767 A1 | 5/2012 | Schmidt | | |
| 2014/0373759 A1 * | 12/2014 | Rumeau | ................... | A47B 1/05 108/44 |
| 2015/0366337 A1 * | 12/2015 | Luebke | ................. | A47B 13/02 108/167 |

(Continued)

FOREIGN PATENT DOCUMENTS

| | | | | |
|---|---|---|---|---|
| DE | 102019208758 A1 * | 12/2020 | ............ | B60N 3/001 |
| EP | 3456603 A1 * | 3/2019 | ............ | A47B 13/06 |

(Continued)

*Primary Examiner* — Jose V Chen
(74) *Attorney, Agent, or Firm* — Dykema Gossett PLLC

(57) ABSTRACT

Aspects of the present disclosure are directed to, for example, a table for a vehicle, the table including at least one base for fastening to the vehicle, and a table plate connected to the base. The table plate is elastically movable crosswise to a longitudinal axis of the table, in relation to the base, via a connection apparatus.

15 Claims, 3 Drawing Sheets

(56) References Cited

U.S. PATENT DOCUMENTS

| | | | | |
|---|---|---|---|---|
| 2016/0082984 A1* | 3/2016 | Schmidt | ............... | B61D 37/00 |
| | | | | 108/44 |
| 2019/0061491 A1* | 2/2019 | Hoggarth | ............... | B60J 5/0493 |
| 2021/0282545 A1* | 9/2021 | Bugg | ............... | A47B 13/081 |

FOREIGN PATENT DOCUMENTS

| | | | | |
|---|---|---|---|---|
| EP | 3875339 A1 * | 9/2021 | | |
| FR | 2994410 A1 | 2/2014 | | |
| WO | WO-2013045757 A1 * | 4/2013 | ............. | B60N 3/001 |
| WO | WO-2020128940 A1 * | 6/2020 | ............. | A47B 13/02 |

\* cited by examiner

TABLE FOR A VEHICLE

CROSS-REFERENCE TO RELATED APPLICATIONS

This application is a national stage filing based upon International application No. PCT/AT2019/060250, filed 6 Aug. 2019, which claims the benefit of priority to Austria application No. A 50688/2018, filed 13 Aug. 2018.

BACKGROUND

The invention relates to a table for a vehicle, wherein the table has at least one base for attachment to the vehicle, as well as a tabletop connected to the base, and wherein the tabletop is elastically movable relative to the base transversely to a longitudinal axis of the table by way of a connecting device.

In vehicles, particularly rail vehicles, it is customary to arrange tables for passengers, a total of four seats usually being assigned thereto. Generally, two adjacent seats are directed in the direction of travel and two opposite seats are directed against the direction of travel and the table is arranged therebetween. Accordingly, the longitudinal axis of the table is usually oriented transversely to the direction of travel of the vehicle.

Here, the direction of travel means the main direction of travel of the vehicle, in which the vehicle generally primarily moves. In the vast majority of cases, the direction of travel is parallel to the longitudinal axis of the vehicle.

To protect the passengers sitting on the seats in the direction of travel, the table may have an energy absorption mechanism. When strong accelerations occur, for example in the case of emergency braking or a collision, the kinetic energy of the passengers striking the table is at least partially absorbed and the risk of injury to said passengers is reduced.

EP 2 956 347 B1 describes a table having plastically deformable connecting elements, which in the event of an impact undergo plastic deformation and thus absorb energy. However, this is disadvantageous since, following such an incident, substantial parts of the table have to be replaced in order to make the table functional again. The work associated with this is complicated and expensive.

US 2012/0132767 A1 discloses an improved system comprising elastically movable connecting arms and connecting rods, which extend vertically from the base to the tabletop. This prevents the parts from being destroyed in the event of emergency braking. In addition, the risk of injuries is further reduced. One disadvantage, however, is that parts of the passengers' bodies may be crushed since the height of the tabletop changes during the movement.

SUMMARY OF THE INVENTION

The object is therefore to provide a table of the aforementioned type which has a reduced risk of injury to passengers when strong accelerations occur. The aim is for only a reversible deformation to occur up to a certain load limit, i.e. the table automatically returns to its starting position.

This object is achieved according to the invention in that the connecting device has at least one elastic connecting bar which extends substantially along the longitudinal axis and via which the tabletop is connected to the base.

By arranging a connecting bar in this way, a purely or predominantly horizontal movement of the tabletop can be achieved. The risk of injury to the passenger is thus reduced.

The arrangement is particularly advantageous since the connecting bar can be arranged directly underneath the tabletop, which saves space and provides said bar with better protection against damage or vandalism.

Stated directions or orientations, such as upwards or horizontal, relate to an intended installed position of the table in a vehicle.

In addition to the connecting bar, the connecting device may have further elastically deformable elements which improve the energy absorption. These elements may be connected in series or in parallel with the connecting bar.

It is particularly advantageous if the base is fixedly connected to a substructure which extends substantially along the longitudinal axis, and the tabletop is arranged on the substructure in an elastically movable manner. The substructure may be configured such that the connecting bar can be arranged therein, in a manner protected against unauthorized manipulation. The tabletop may be movably arranged on the substructure and may rest thereon. The substructure and the base may also be formed in one piece. Preferably, the substructure has a smaller width than the tabletop transversely to the longitudinal axis. This enables the tabletop to move transversely to the longitudinal direction, even though it protrudes at least partially beyond the substructure at its side edges.

It may further be provided that the connecting bar is connected at its ends to the tabletop and in a central attachment region between the ends is connected to the base. The central attachment region is preferably connected to the substructure, if provided. This is particularly advantageous since both sides of the tabletop can thus easily be spring-loaded. This is particularly important in the case of tables having two seats for people at one side. If both seats are taken and if both people strike the same side of the table during a collision, both halves of the tabletop move substantially in the same direction. If the people are of equal weight, an approximately parallel displacement of the tabletop will occur. If only one seat is occupied, rotation of the tabletop will occur.

In one preferred embodiment, it is provided that the connecting device has at least one elastically deformable secondary element. Said secondary element may be configured for example as a preferably spring-loaded shock absorber and may work together with the elastic deformation of the connecting bar, for example dampening the latter.

It may further be provided that the elastically deformable secondary element is connected in parallel with the connecting bar between the tabletop and the base. This means that at least two connecting paths exist between the tabletop and the base: one via the connecting bar and one via the secondary element. The elastic deformations of these two deformable components thus act in parallel and not in series. Alternatively, they may also be connected in series with one another. In this case, the secondary element need not absorb energy over the entire range of motion of the tabletop. It may also be provided for example that the secondary element has an idle mode and absorbs energy only with effect from a certain degree of displacement between the tabletop and the base.

If it is provided that the secondary element has two end pieces which are elastically displaceable relative to one another, and said end pieces are supported against two opposite bearing surfaces of the substructure, and that at least one end piece is connected to the tabletop via at least one bearing piece, then the tabletop can be mounted in a movable manner, while the secondary element absorbs energy. If at least one bearing piece is provided on each end piece, the tabletop can be mounted such as to be elastically movable in two directions. In this case, the bearing surfaces are preferably arranged opposite one another along an axis, the axis being transverse to the longitudinal axis. The connection to the tabletop need not be provided in all positions of the tabletop for the bearing piece. When the tabletop is moved in one direction, a first end piece is pushed by a bearing piece in the direction of the second end piece, which bears on the bearing surface and is supported against the latter. When moving in the opposite direction, the bearing piece connected to the second end piece is pushed in the direction of the first end piece, which in turn bears on the other bearing surface.

It is particularly advantageous if a connecting piece connected to the tabletop is arranged transversely to the longitudinal axis in front of or behind at least one bearing piece connected to the secondary element, and that in the unloaded state of the tabletop the connecting piece is at a distance from the bearing piece. This opens up for the tabletop a range of motion in which the secondary element does not elastically deform. Preferably, however, an elastic deformation of the connecting bar does at least partially occur in this range. An elastic deformation of the secondary element occurs only when there is movement beyond said range.

It may be provided that a bearing piece is arranged transversely to the longitudinal axis on both sides of the connecting piece and at a distance from the latter in the unloaded state. As a result, the elastic deformation of the secondary element can take place upon exceeding the range of motion in both directions. This is particularly advantageous since train carriages, in particular, are often guided along their main axis in both directions. The direction in which the table is installed is therefore irrelevant since it is elastically deformable in both directions.

Space is saved if the at least one connecting piece is arranged at least at one end of the connecting bar. As a result, the connecting piece can have a dual function for connection to the connecting bar and for connection to the secondary element.

If the connecting bar has at least one leaf spring, preferably is configured as a leaf spring stack, good elastic mobility can thus be achieved. The leaf spring is preferably arranged such that the spring-loaded main direction of action in the intended installed position is transverse to the longitudinal axis and is substantially horizontal. The advantage of a leaf spring stack lies in the inherent damping, which is advantageous with regard to energy dissipation.

It is particularly advantageous if the tabletop has a connecting pin substantially centrally along the longitudinal axis, which connecting pin is connected to a slider of the substructure, and that the slider is movable relative to the substructure transversely to the longitudinal axis. This enables a movable mounting of the tabletop transversely to the longitudinal axis. The slider may be elastically movable, for example may be spring-loaded, or else may serve mainly to guide the tabletop and not to contribute to energy absorption, or to contribute thereto only to a very subordinate extent.

If it is provided that the substructure has at least one friction element which bears against the tabletop in a spring-loaded manner, then an additional damping of the movement of the tabletop relative to the substructure can be achieved.

It may be provided that the substructure has at least one table leg which can be connected to a vehicle floor. This enables a particularly good connection to the vehicle. The table can be attached at different heights depending on the length of the leg.

It is particularly advantageous if the base can be connected to a vehicle wall of the vehicle. Lateral attachment to a side wall of the vehicle is particularly advantageous.

BRIEF DESCRIPTION OF THE DRAWINGS

The present invention will be explained in greater detail below on the basis of a non-limiting embodiment variant which is shown in the figures. In the figures.

DETAILED DESCRIPTION

Figure 1:
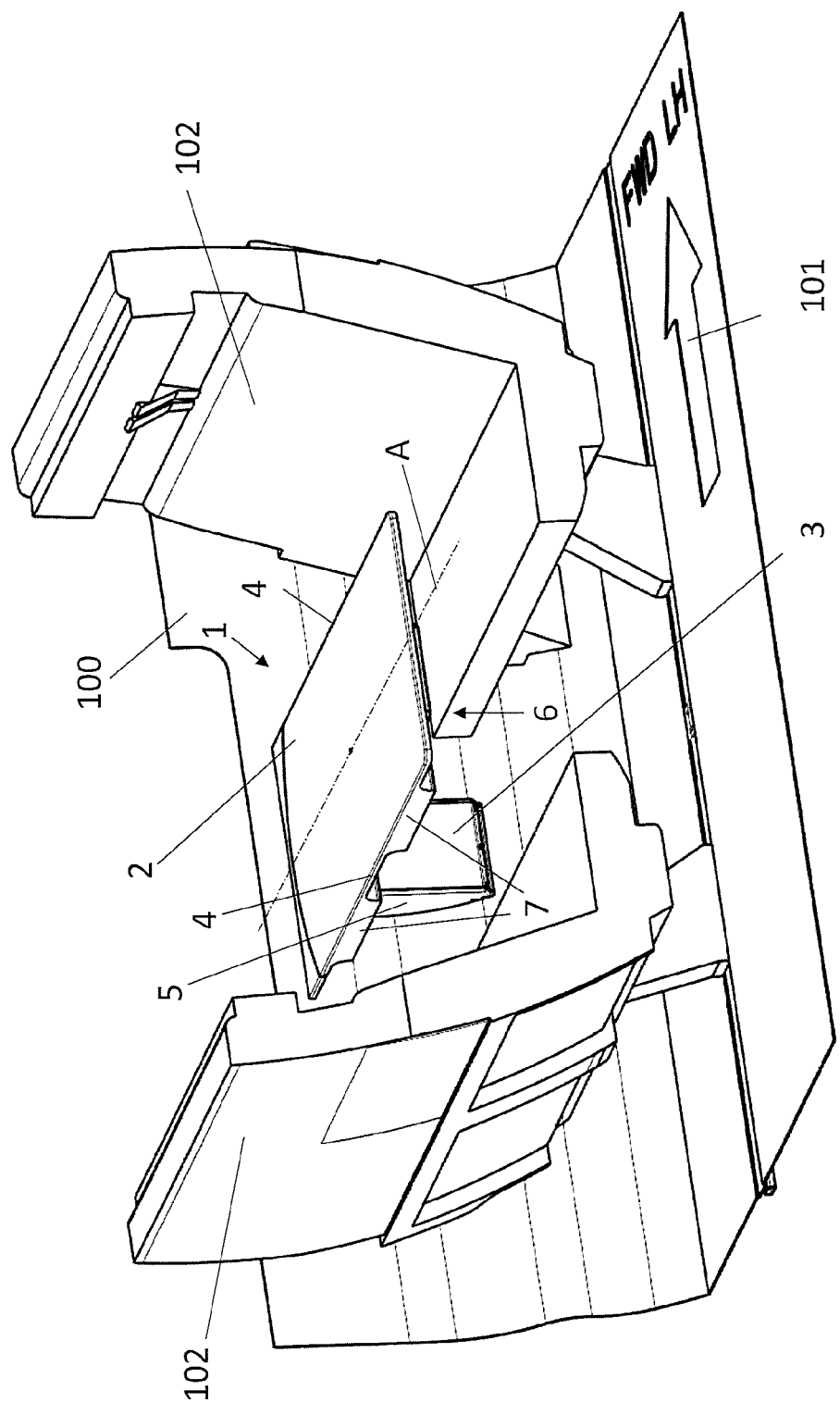
FIG. 1 shows an embodiment of a table according to the invention in an installed position in a vehicle in a schematic oblique view.

FIG. 1 shows a table 1 according to the invention having a substantially rectangular tabletop 2 and a base 3. The table 1 is arranged in a vehicle (shown in part), here a train carriage, on a vehicle side wall 100 of the vehicle. A longitudinal axis A of the table 1 extends parallel to the longer side edges 4 of the tabletop 2 and is transverse to a direction of travel 101 of the vehicle. The base 3 has a substantially vertical wall part 5, bearing against the vehicle side wall 100, and a substructure 6 directly below the tabletop 2. The tabletop 2 protrudes in some sections beyond the substructure 6 at the side edges 4 and thus forms two extended impact surfaces 7 at each side. In each case two seats 102 are arranged at both side edges 4 of the tabletop, two facing in and two facing against the direction of travel 101. The impact surfaces 7 are arranged directly in front of the seats 102 along the direction of travel 101 and thus offer a larger surface area at which passengers can strike the table 1 in the event of a collision.

In line with the tabletop 2, the wall part 5 on the vehicle side wall 100 has a slightly rounded region which points towards the tabletop 2 and against which a broad edge of the tabletop 2 bears. This broad edge likewise has a rounded shape adapted thereto. If only one of the seats 102 in the direction of travel is occupied and a collision occurs, the tabletop 2 can thus more easily rotate relative to the base 3, without damaging the base 3 or the tabletop 2.

Figure 2:
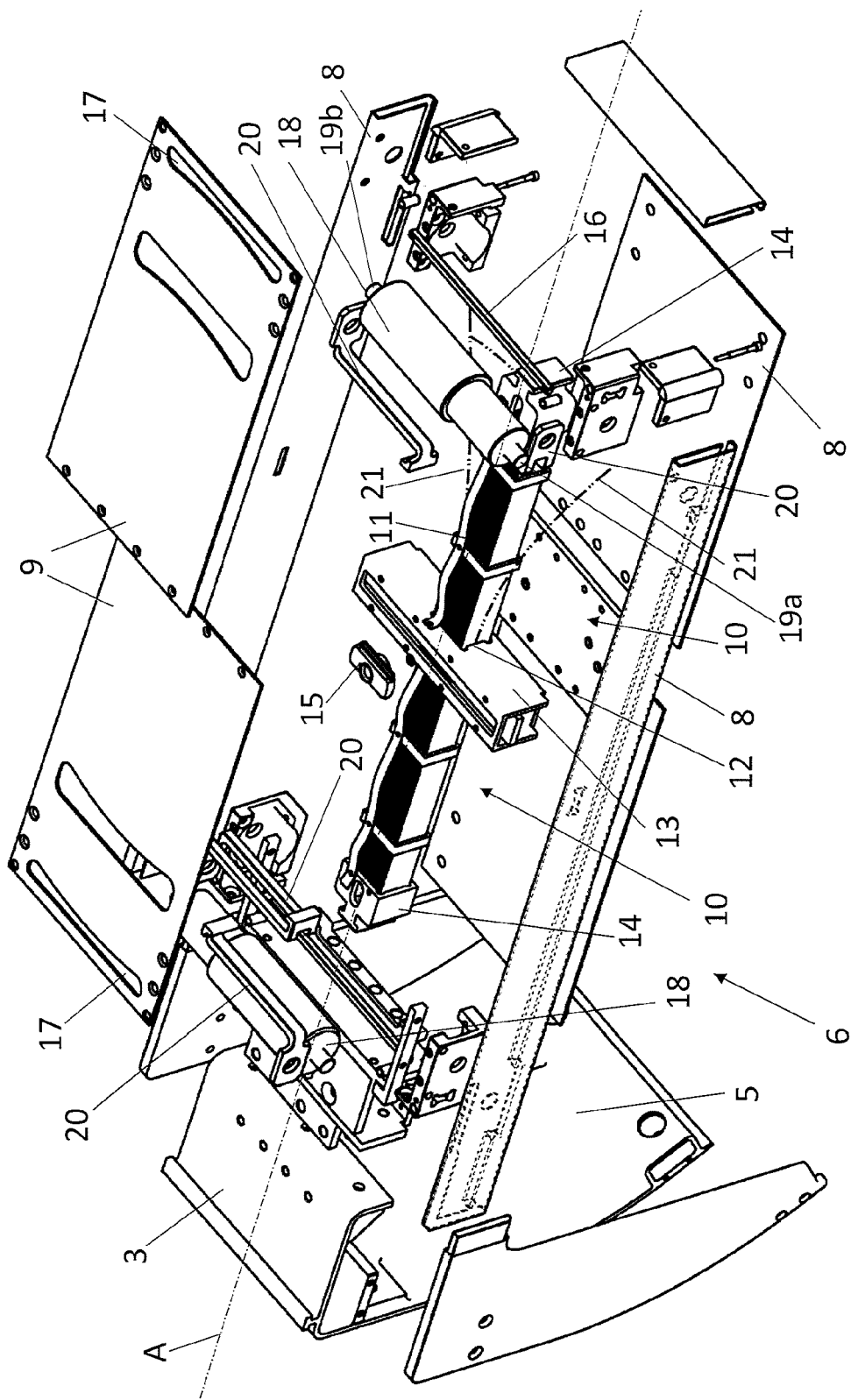
FIG. 2 shows an exploded view of the base of the embodiment of FIG. 1.

The base 3 is shown in an exploded view in FIG. 2. For better clarity, some components such as screws are not shown or are shown only in part. The wall part 5 of the base 3 is made of high-strength steel and/or aluminium and primarily performs the task of statically mounting the table 1. Said wall part consists of a panel which bears against the vehicle wall 100 and which corresponds to the contour of the vehicle wall 100, as well as side parts. The substructure 6 has a shell 8 made of steel panels and/or aluminium panels, wherein two shell panels 9 provided with openings are arranged on the side facing towards the tabletop 2. Arranged in the interior of the substructure 6 is a connecting device 10 having a connecting bar 11, which connecting bar is configured as a leaf spring stack, extends substantially along the longitudinal axis A and is shown in an unloaded state. The surfaces of the leaf springs point in or against the direction of travel, and therefore the elastic deformation is best possible in or against the direction of travel. This bending transversely to the longitudinal axis A and thus in or against the direction of travel is schematically indicated by lines 21.

Centrally along its length, the connecting bar 11 has an attachment region 12 which is fixedly connected to a crossbar 13 of the substructure 6. Connecting pieces 14 with slots pointing towards the tabletop 2 are arranged at the ends of the connecting bar 11. In the unloaded state of the connecting bar 11, the slots extend along the longitudinal axis A and thus along the length of the connecting bar 11. Connecting pins of the tabletop 2 can engage in said slots and thus establish a connection. The leaf spring stack is held together by a total of four clips, two on each side of the connecting bar 11. The clips are movably arranged on the leaf spring stack. The clips are held together by way of a fabric strip, which acts as a positioning aid and is connected both to the clips and also to the crossbar 13 and the connecting pieces 14.

The crossbar 13 has a guide, in which a slider 15 is arranged, said slider being movable transversely to the longitudinal axis A. Said slider has an opening, in which a connecting pin of the tabletop 2 can engage. The connecting pin is preferably arranged centrally on the tabletop 2.

A spring rod 16 is provided at each end of the substructure 6, said spring rods being pressed in the direction of the tabletop 2 in a spring-loaded manner. The shell plates 9 have through-openings 17, through which the spring rods 16 can be pressed onto the underside of the tabletop 2. The spring rods 16 are covered on their upper side with a friction layer, such as a layer of felt, which damps the movements of the tabletop 2. This friction layer may also be arranged on the underside of the tabletop 2. The spring rods 16 thus act as friction elements. A secondary element 18 is also arranged at each end of the substructure 6 along the longitudinal axis A, which secondary element extends substantially transversely to the longitudinal axis A. Each secondary element has two end pieces 19a, 19b in the form of pegs, which bear against bearing surfaces of the shell 8 of the substructure 6 transversely to the longitudinal axis A.

Figure 3:
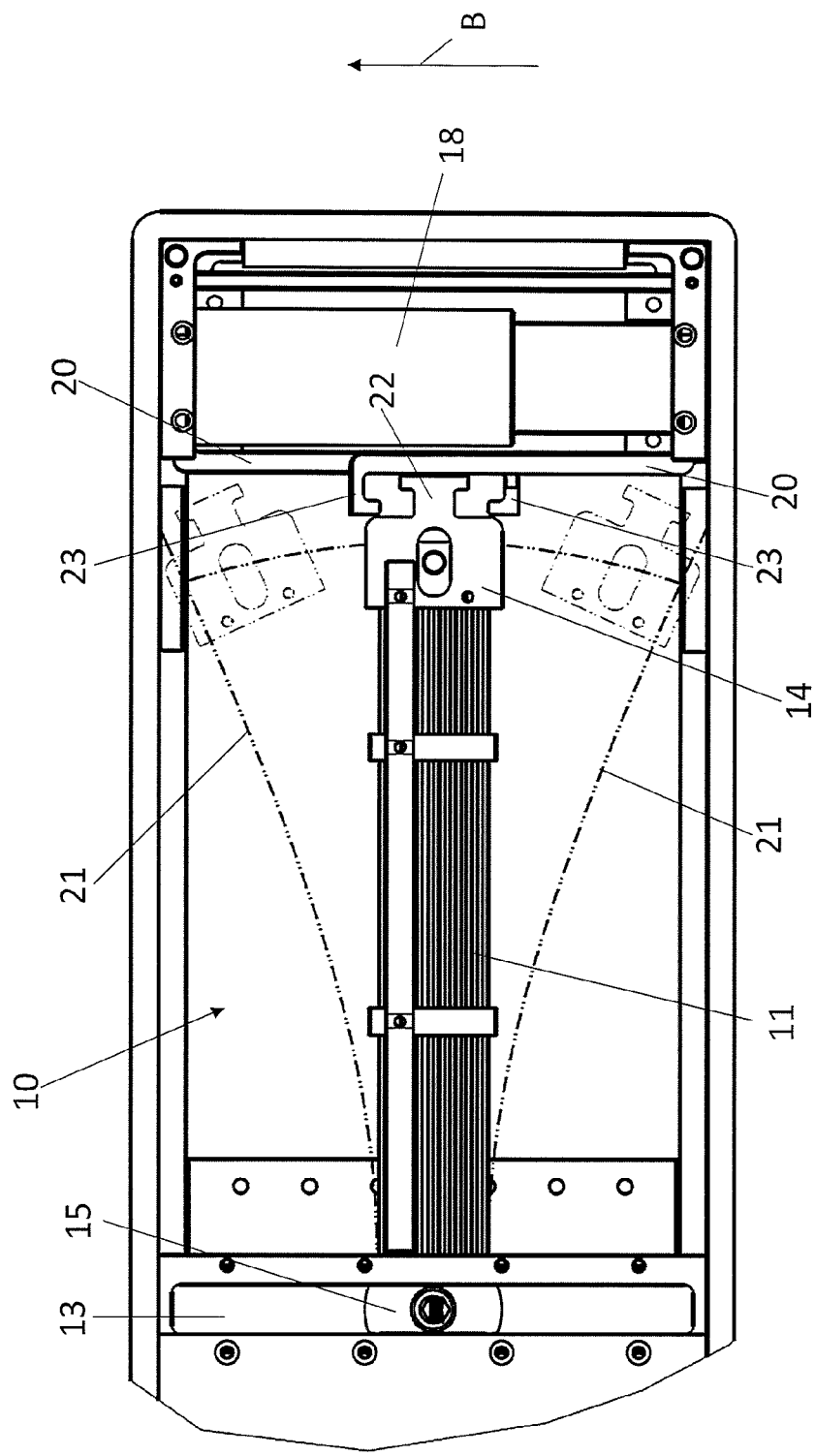
FIG. 3 shows a detail of the substructure in a plan view.

The mode of operation of the connecting device 10 can be seen in FIG. 3. To this end, one of the shell plates 9 has not been shown. A bearing piece 20 is plugged onto each end piece 19a, 19b, said bearing piece being S-shaped and extending from the end piece 19a, 19b to which it is connected, along the side of the secondary element 18, to beyond half the length of the secondary element 18. To this end, the bearing pieces 20 have openings, in which the peg-shaped end pieces 19a, 19b can engage (as can be seen in FIG. 2). On the sides pointing towards the secondary elements 18, the connecting pieces 14 have anchors 22 which, in the unloaded state of the tabletop 2, do not enter into contact with engagement hooks 23 of the bearing pieces 20. The connecting piece 14 and the anchor 22 are formed in one piece, and the engagement hooks 23 and the bearing pieces 20 are also formed in one piece. Said bearing pieces 20 are arranged in line with the engagement hooks 23 along the longitudinal axis A, but at a distance from said hooks. If the tabletop 2 is moved in a direction B, for example due to being struck by up to two passengers, the connecting bar 11 will be elastically bent in precisely this direction. If only slight bending occurs, the secondary elements 18 remain unchanged. If the bending is so pronounced that the anchors 22 each reach one of the engagement hooks 23, which are connected to first end pieces 19a, then the connection between the tabletop 2 and the secondary element 18 will be closed. The first end pieces 19a will thus be pressed in the direction of the second end pieces 19b, which bear against the substructure 6 and are immovable. An elastic deformation of the secondary elements 18 thus occurs as a result of the further movement of the tabletop 2. Therefore, in addition to the connection via the connecting bar 11, a further energy-absorbing connection between the tabletop 2 and the base 3 is created in parallel therewith. If the tabletop 2 moves in the opposite direction, the connecting device 10 behaves substantially analogously, use being made of the engagement hooks 23 which are connected to the second end pieces 19b.

If only one person strikes the tabletop 2 off-centre, the unequal application of force leads to a rotation of the tabletop 2 or to an overlapping movement of rotation and displacement.

The secondary element 18 is constructed in two parts as an internally spring-loaded shock absorber.

The embodiment described in the figures is configured for a 4-person seating area, so that therefore two people sit at the table in the direction of travel and two people sit at the table against the direction of travel. In an alternative embodiment, it may be provided that just one person sits in the direction of travel and one person sits against the direction of travel. The table is therefore smaller, it preferably being possible to use substantially the same technology, with appropriate adaptations and adjustments where necessary. In this case, only one half of the table may be implemented, so that the crossbar 13 is arranged on the vehicle side wall 100 and the connecting bar 11 extends from the crossbar 13 in only one direction. Accordingly, preferably also only one secondary element 18 would then be provided. Alternatively, the same internal structure as shown in the figures may be provided, but in a shorter embodiment along the side edges 4, so that only one seat is arranged at each side edge 4. In principle, it is also possible to provide tables with more than two seats in the direction of travel, that is to say with three or four seats.

The invention claimed is:

1. Table for a vehicle comprising:
   at least one base configured and arranged for attachment to the vehicle;
   a connecting device having at least one elastic connecting bar which extends substantially along a longitudinal axis;
   a tabletop connected to the base, the tabletop is elastically movable relative to the base transversely to the longitudinal axis of the table by way of the connecting device;
   wherein the connecting device further has at least one elastically deformable secondary element, and both the at least one elastically deformable secondary element and the at least one elastic connecting bar are connected in parallel between the tabletop and the base.

2. The table according to claim 1, further including a substructure that is fixedly connected to the base and which extends substantially along the longitudinal axis, and wherein the tabletop is arranged on the substructure in an elastically movable manner.

3. The table according to claim 2, wherein the substructure includes a slider, and the tabletop further includes a connecting pin positioned substantially centrally along the longitudinal axis, the connecting pin configured and arranged to be connected to the slider of the substructure, and in that the slider is configured and arranged to be movable relative to the substructure transversely to the longitudinal axis.

4. The table according to claim 2, characterized in that the substructure has at least one friction element configured and arranged to bear against the tabletop in a spring-loaded manner and thereby further dampens movement of the tabletop relative to the sub structure.

5. The table according to claim 2, characterized in that the substructure has at least one table leg configured and arranged to be connected to a vehicle floor.

6. The table according to claim 1, wherein the at least one elastic connecting bar includes two ends and a central attachment region between the two ends, and the ends of the at least one elastic connecting bar are connected to the tabletop, and the central attachment region is connected to the base.

7. The table according to claim 1, further including a substructure that is fixedly connected to the base and which extends substantially along the longitudinal axis, the substructure including two opposite bearing surfaces;
at least one bearing piece;
wherein the tabletop is arranged on the substructure in an elastically movable manner; and
wherein the at least one elastically deformable secondary element has two end pieces configured and arranged to be elastically displaceable in response to elastic deformation of the at least one elastically deformable secondary element, said two end pieces are supported against the two opposite bearing surfaces, and in that at least one end piece of the two end pieces is connected to the tabletop via the at least one bearing piece.

8. The table according to claim 1, further including
at least one bearing piece connected to the at least one elastically deformable secondary element, and
a connecting piece connected to the tabletop and arranged transversely to the longitudinal axis in front of or behind the at least one bearing piece, and in that in an unloaded state of the tabletop the connecting piece is at a distance from the bearing piece.

9. The table according to claim 8, characterized in that the at least one bearing piece is arranged transversely to the longitudinal axis on each side of the connecting piece and at a distance from the latter in the unloaded state.

10. The table according to claim 8, characterized in that the connecting piece is arranged at least at one end of the at least one elastic connecting bar.

11. The table according to claim 1, characterized in that the at least one elastic connecting bar is at least one leaf spring.

12. The table according to claim 1, characterized in that the base is configured and arranged to be connected to a vehicle wall of the vehicle.

13. Table for a vehicle comprising:
at least one base configured and arranged for attachment to the vehicle;
a connecting device having at least one elastic connecting bar which extends substantially along a longitudinal axis;
a tabletop connected to the base, the tabletop is elastically movable relative to the base transversely to the longitudinal axis of the table by way of the connecting device;
characterized in that the at least one elastic connecting bar is at least one leaf spring.

14. Table for a vehicle comprising:
at least one base configured and arranged for attachment to the vehicle;
a connecting device having at least one elastic connecting bar which extends substantially along a longitudinal axis;
a tabletop connected to the base, the tabletop is elastically movable relative to the base transversely to the longitudinal axis of the table by way of the connecting device; and
a substructure that is fixedly connected to the at least one base and which extends substantially along the longitudinal axis, and wherein the tabletop is arranged on the substructure in an elastically movable manner;
wherein the substructure includes a slider and the tabletop includes a connecting pin positioned substantially centrally along the longitudinal axis, the connecting pin configured and arranged to be connected to the slider of the substructure, and in that the slider is configured and arranged to be movable relative to the substructure transversely to the longitudinal axis.

15. The table of claim 1, wherein respective elastic deformations components of the at least one elastically deformable secondary element and the at least one elastic connecting bar are configured and arranged to act in parallel.

* * * * *